(12) United States Patent
Dehm

(10) Patent No.: US 6,584,726 B2
(45) Date of Patent: Jul. 1, 2003

(54) FISH HOOK REMOVER

(76) Inventor: Henry Christopher Dehm, 3003 E. 4505 S., Salt Lake City, UT (US) 84117

( * ) Notice: Subject to any disclaimer, the term of this patent is extended or adjusted under 35 U.S.C. 154(b) by 0 days.

(21) Appl. No.: 10/080,726

(22) Filed: Feb. 22, 2002

(65) Prior Publication Data

US 2002/0174594 A1 Nov. 28, 2002

Related U.S. Application Data

(60) Provisional application No. 60/270,535, filed on Feb. 23, 2001.

(51) Int. Cl.[7] .............................................. A01K 97/18
(52) U.S. Cl. ....................................................... 43/53.5
(58) Field of Search ........................................... 43/53.5

(56) References Cited

U.S. PATENT DOCUMENTS

| | | | | |
|---|---|---|---|---|
| 2,103,008 A | * | 12/1937 | Kinast .......................... | 43/53.5 |
| 2,387,928 A | * | 10/1945 | Monnier ....................... | 43/53.5 |
| 2,502,793 A | * | 4/1950 | Kinney ......................... | 43/53.5 |
| 2,519,098 A | * | 8/1950 | Aye .............................. | 43/53.5 |
| 2,586,431 A | * | 2/1952 | Krichbaum ................... | 43/53.5 |
| 2,797,523 A | * | 7/1957 | Dillard ......................... | 43/53.5 |
| 2,828,574 A | * | 4/1958 | Metzger ....................... | 43/53.5 |
| 3,377,735 A | * | 4/1968 | Daughtry ..................... | 43/53.5 |
| 3,713,243 A | * | 1/1973 | Tetzner ........................ | 43/53.5 |
| 4,014,131 A | * | 3/1977 | Bendik ......................... | 43/53.5 |
| 4,206,561 A | * | 6/1980 | Wong et al. .................. | 43/53.5 |
| 5,644,865 A | * | 7/1997 | Harrison et al. ............. | 43/53.5 |
| 6,032,403 A | * | 3/2000 | Steck, III ..................... | 43/53.5 |

FOREIGN PATENT DOCUMENTS

| | | | | |
|---|---|---|---|---|
| DE | 2318691 B1 | * | 11/1974 | ................. 43/53.5 |
| DE | 2416116 B1 | * | 10/1975 | ................. 43/53.5 |
| GB | 873063 B1 | * | 7/1961 | ................. 43/53.5 |

* cited by examiner

Primary Examiner—Darren W. Ark
(74) Attorney, Agent, or Firm—Ray Quinny and Nebecker

(57) ABSTRACT

An inexpensive ergonomically sound hand-held device for removing a fish hook from a fish's lip, jaw, mouth or throat without removing the fish from the water or handling it in any way is disclosed. To remove a hook, the leader or line is pulled through a zero-width slit in the polymeric distal end. The slit expands during this process and then contracts, preventing the line or leader from exiting the device. There is no damage to the dressing of flies size 28 through size one. The released fish cannot be rehooked. The device is so simple to use that it works well even in the dark. It is injection molded from glass filled nylon, has a non-slip handle and is essentially unbreakable.

13 Claims, 2 Drawing Sheets

Figure 2:
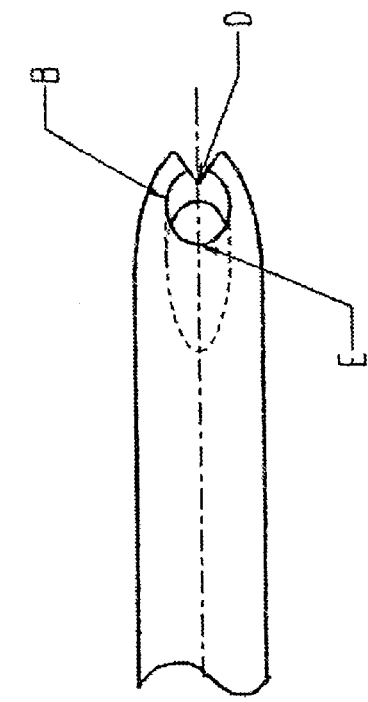

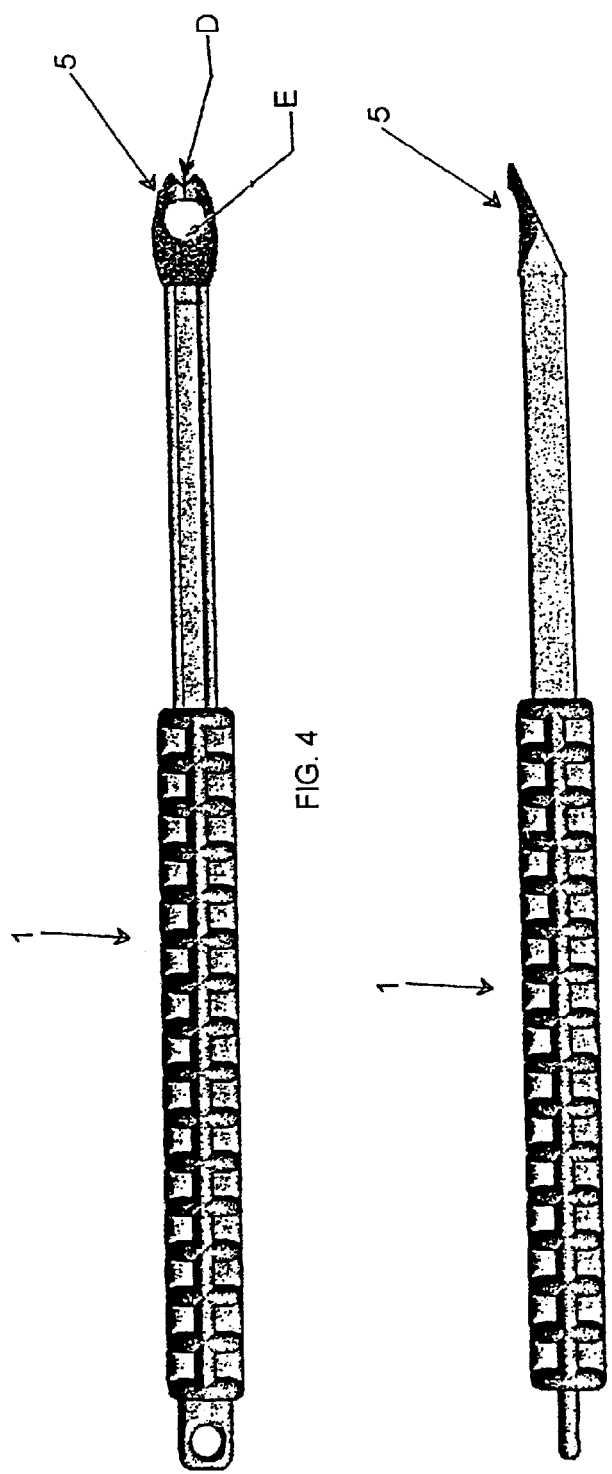
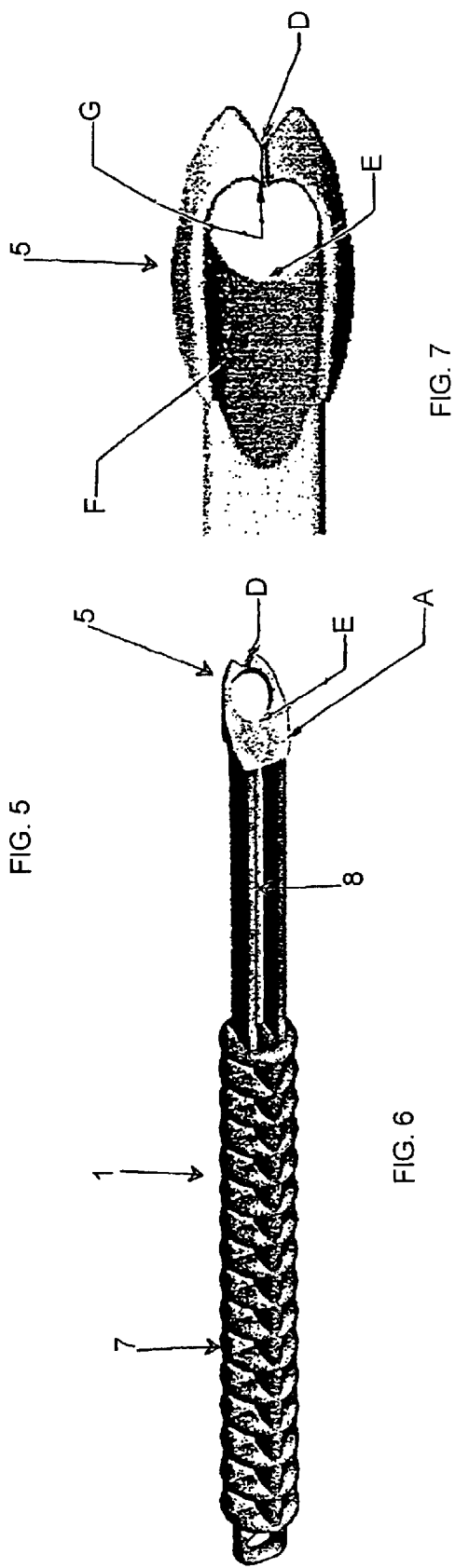

FISH HOOK REMOVER

This Application Claims the Benefit of U.S. provisional Application No. 60/270,535 filed Feb. 23, 2001.

BACKGROUND OF THE INVENTION

1. Field of the Invention

The present invention relates to a simple, inexpensive, and easily fabricated device for removing a fish hook located anywhere in a fish's lip, jaw, mouth or throat without removing the fish from the water or handling it in any way. When the hook is dressed as an artificial fly, the dressing is unharmed.

2. State of the Art

Excellent summaries of the state of the art can be found in U.S. Pat. No. 5,644,865 columns 1 and 2, and U.S. Pat. No. 6,032,403 columns 1 and 2. In U.S. Pat. No. 5,644,865, the prior art mentioned focuses on the disadvantages of the "clamping type" device such as forceps and pliers:

Forceps and pliers can damage the fly, especially if the fly is very small.

These devices are cumbersome to use.

The fish must be grasped when a clamping type device is used to remove a hook. Improper handling of the fish at this time greatly reduces the chance that the fish will survive.

The disadvantages of the "Ketchum Release" device described in U.S. Pat. No. 5,644,865 are:

A single "Ketchum Release" device cannot handle the range of fly sizes normally used by fly fishermen. Originally, three sizes were marketed as "Midge," "Standard," and "Big Bug." The Orvis 2002 catalog shows two sizes, Small (hooks 10–18) and Large (hooks 10+) without defining 10+. The Ketchum Release device is also expensive to make.

Other drawbacks are mentioned in U.S. Pat. No. 6,032,403:

An effort must be maintained to prevent the line from escaping the tubular portion of the device.

The device is awkward to use because it is ergonomically unsound.

Because the tubular section is at an angle to the handle, it sometimes cannot be inserted into the fish's mouth properly; the handle hits the fish's nose or jaw.

Engaging the bend of the hook is made difficult because the fisherman must concentrate on keeping the line away from the tube's slit.

The device described in U.S. Pat. No. 6,032,403 is expensive to make. Two different designs are required: one for "small" fish and one for "larger" fish. The terms "small" and "larger" are not defined.

OBJECTIVES AND SUMMARY OF THE INVENTION

The principle objective of the present invention is to provide a simple device for removing a fish hook located anywhere in a fish's lips, jaw, mouth or throat without removing the fish from the water or handling the fish in any way. This in turn makes it easy for the fisherman to practice "Catch and Release."

A further objective of the present invention is to provide a device that eliminates the possibility of rehooking the fish at the instant the fish is released.

A still further objective of the present invention is to provide a device that eliminates damage to the dressing when the hook being removed is dressed as an artificial fly.

A still further objective of the present invention is to provide a single device that is effective in removing the entire range of fly sizes (size 28 through size 1) normally used by fly fishermen.

A further objective of the present invention is to provide a device that prevents the line or leader from exiting the device during the release process.

A further objective of the present invention is to provide a device that is so simple to use that it works well even in the dark.

All of the above objectives are achieved. Examples of the device are shown in the accompanying drawings.

THE DRAWINGS

Embodiments of the present invention are illustrated in the accompanying drawing.

Figure 1:
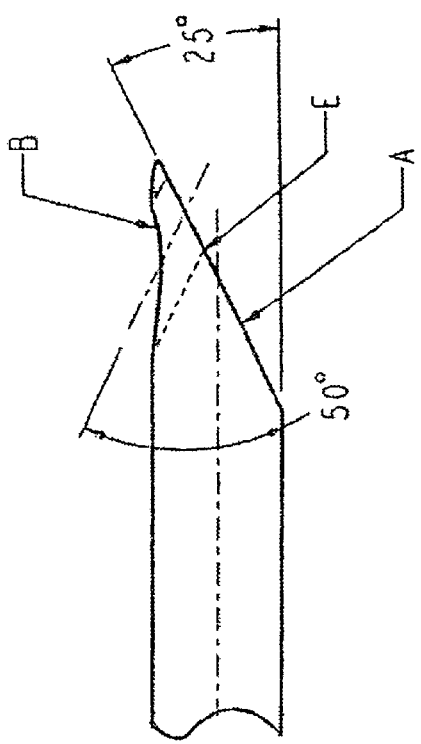

The device 1 has a proximal end 2 with a handle 3 and a distal end 4 with a means for removing a hook 5. FIG. 1 is a side view of the distal end of one embodiment of the device of the present invention. FIG. 2 is a bottom view of the distal end of the device of FIG. 1.

Figure 3:
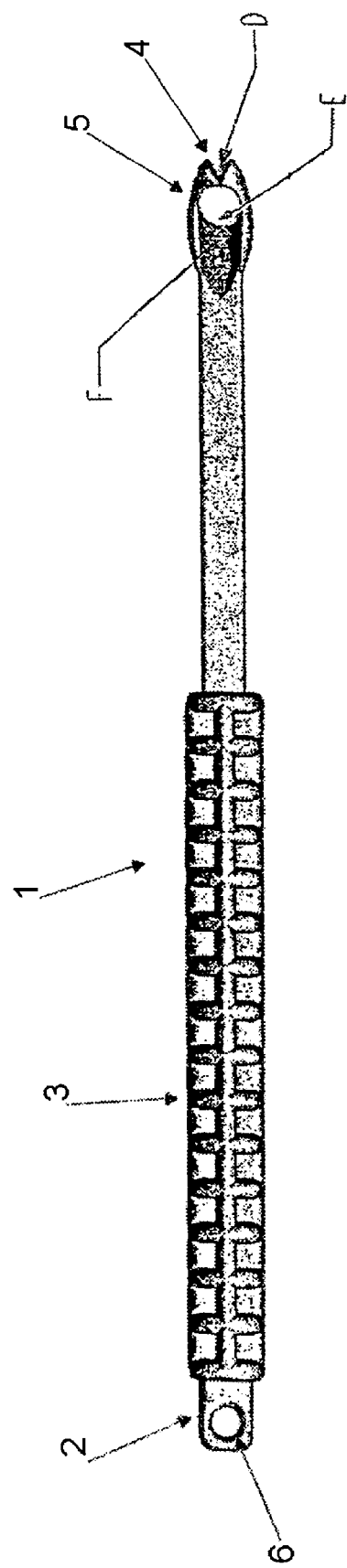

FIG. 3 is a top view of one embodiment of the present invention made by injection molding. FIG. 4 is a bottom view of the device of FIG. 3. FIG. 5 is a side view of the device of FIG. 3. FIG. 6 is a bottom view of the device of FIG. 3 that shows more clearly the construction of the device. FIG. 7 shows in detail the construction of the proximal end of the device. In particular, G, FIG.7 shows how the contour of the region where the line or leader enters the device is modified to prevent the line or leader from exiting the device during the hook removal process.

DETAILED DESCRIPTION OF A PREFERRED EMBODIMENT MADE BY MACHINING

One example of the device 1 of the present invention as illustrated in the drawings is described herein. The device 1 is machined from ⅜-inch diameter plastic rod. The device has a proximal end 2 with a handle 3 and a distal end 4 with a means for removing a hook 5. As shown in FIG. 1, a cut is made at 25° (the cut angle) to produce the plane surface A. Next, a 15/64-inch hole (B, FIGS. 1 and 2) is drilled at 50° (the drill angle) from plane surface A. Next, the tip of the distal end 4 of the device can be constructed as shown in FIG. 2 and provided with a zero width expandable slit D, FIG. 2. For this example, the device is 7 inches long and its proximal end 2 is provided with the means to attach a zinger 6 (see FIG. 3) of appropriate size. The zinger can be equipped with a spring-loaded clip for attaching to the fisherman's belt.

When the device shown in FIGS. 1 and 2 was machined from ⅜-inch diameter rod, it easily removed dry flies, wet flies and streamers from size 28 through size 1 (with a 0.44-inch gap) with no visible damage to the dressings. When the device was machined from ¼-inch diameter rod and scaled down proportionally, it removed flies from size 28 through size 8 (0.22-inch gap) with no damage to the flies.

The device can be scaled upward to accommodate the hooks used to catch large sport fish such as bass, pike, barracuda, tarpon and sailfish.

The device is made by machining appropriate polymeric or metallic rods with round, square or rectangular cross-sections. A preferred polymer is ultrahigh molecular weight polyethylene. It is extremely tough and wear-resistant, an important consideration with respect to the long-term integrity of edge E, FIGS. 1, 2, 3, 4, 6 and 7. Molybdenum disulfide-filled polymers are especially easy to machine. Thermoplastic and thermoset polymers filled with chopped or continuous glass or other reinforcing fiber or material in order to improve the mechanical or wear properties of the device can complicate the machining operation. Glass, for example, quickly dulls the cutting edge of machine tools.

DETAILED DESCRIPTION OF A PREFERRED EMBODIMENT MADE BY INJECTION MOLDING

To produce a quality hook remover in large quantities at a reasonable price, the device shown in FIGS. 3, 4, 5 and 6, is made by injection molding.

The spatial relationships of the distal end of the injection-molded device shown full scale in FIGS. 3, 4 and 5 are exactly the same as shown in FIGS. 1 and 2. Hole B, FIGS. 3, 4 and 5, would have been made by a $15/64$-inch drill, the same drill used to make hole B, FIGS. 1 and 2 when machined from $3/8$" diameter plastic rod.

The fins 7 and thin-walled channel 8 design shown in FIG. 6 not only reduces the amount of casting powder required to fill the mold, but also minimizes the residence time in the mold. At the same time, the design, together with the chopped glass reinforcing filler, produces a very strong, rigid and attractive product with a comfortable non-slip handle. Edge E, FIGS. 1, 2, 3, 4, 6 and 7, the part of the device that engages the bend in the hook, is also made very wear resistant. The distal end is as shown in FIGS. 1 and 2. FIGS. 3, 4 and 5 are full scale and exactly seven inches long, a size (although not limiting) that fills the need of most fly fishermen.

A preferred molding powder is nylon 6 (polycaprolactam) filled with chopped glass fiber. (30% by weight) and with carbon black (1% by weight), sufficient to impart a uniform, attractive, dull black finish that will not scare fish on a bright day. The carbon black also prevents degradation of the polymer by sunlight.

To minimize the cost of the mold, the cavities can be confined to the distal end of the device. A handle of appropriate length and shape and made of appropriate material would be provided separately.

There are other advantages in making the device in two parts. Large toothy fish such as pike and barracuda can be released with no danger to the fisherman, provided the handle is sufficiently long. Also, for fishing in very cold water, the device should be long enough to prevent the hand from getting wet. In these cases, the device can be provided with two handles, one long and the second of normal length. A device consisting of a short metallic or reinforced polymeric distal end attached to a strong light-weight composite handle of appropriate length is useful when fishing from a boat for large sport fish.

THE FUNCTION OF THE DEVICE

When a hooked fish is reeled in close enough for release, the fisherman grasps the device in his free hand with the flat surface underneath and the thumb uppermost, about an inch from the pointed end. He then grasps the taut leader with the first joint of his index finger and guides the leader through slit D, FIGS. 2, 3, 4, 6 and 7. The slit expands as the leader is pulled into the device and then returns to its original zero width. Thus, it is very difficult for the leader bearing the hooked fish to exit the device via the same slit. The difficulty is further increased by contouring the slit entry as shown in G, FIG. 7. Following this, he moves his hand down the device to the handle. With the device locked around the taut leader, it is slid toward the fish. When the edge E, FIGS. 1, 2, 3, 4, 6 and 7 engages the bend in the hook, the device is pushed abruptly and the fish is released.

The thickness of edge E, FIGS. 1, 2, 3, 4, 6 and 7, that engages the bend of the hook is very small. This is the juncture of flat surface A, FIG. 6, and curved surface F, FIG. 7. Thus, very small hooks are easily removed including size 28 with a 50-mil gap. At the other extreme, the same device works well with hooks as large as size one with a 0.44-inch gap. Size one dry flies, wet flies and streamers are easily removed with no noticeable damage to the dressings.

If a hard-used hook remover is no longer effective in removing a size 28 fly from a fish, edge E is easily sharpened by carefully sanding flat surface A (FIG. 6) or curved surface F (FIG. 7) or both.

At the instant the hook is removed from the fish, the point of the hook is held automatically and firmly against the surface of the device, usually against the flat surface underneath. This effectively prevents rehooking the released fish. This is the case for the entire range of hook sizes from size 28 through size one.

With the Ketchum Release device (U.S. Pat. No. 5,644,865), the user must twist the device "in an appropriate direction" (column 7, lines 3 and 4) to prevent rehooking the released fish.

A key part of the present invention shown in FIGS. 1, 2, 3, 4, 6 and 7 is slit D. When the distal end of the device is made of a sufficiently flexible polymer, the slit is made with a sharp blade mounted in a simple jig that orients the device so that the slit is properly placed and confined to the bottom end of the V.

When the distal end of the device is made of a material that is too inflexible to allow a zero width slit to expand and contract properly such as a metal or a thermoset polymer the slit is replaced with an opening just wide enough to admit the line or leader. The region around the opening can be contoured as shown in G, FIG. 7 to prevent the line or leader bearing the hooked fish from escaping. Several other modifications are possible.

Although preferred embodiments of the present invention have been described, it is to be understood that the present disclosures are made by way of example and that various other embodiments are possible without departing significantly from the concepts that have been disclosed. For example, the 25° cut and the 50° drill angle shown in FIGS. 1 and 2 define devices that are effective fish hook removers. We have found other cut and drill angles and combinations thereof that produce useful hook-removing devices. There are undoubtedly many cut and drill angles that work.

As will be evident to those familiar with the problems concerning the release of hooked fish, various modifications can be made in view of the foregoing disclosures and discussions without departing from the spirit or scope of the disclosures. The subject matter of the following claims is regarded as the invention.

I claim:

1. A device for removing a hook from a fish's lip, jaw, mouth or throat without removing the fish from the water or handling it in any way, said device comprising:

a rod member with proximal and distal ends, a longitudinal axis extending therebetween, and upper and lower portions;

the proximal end having a handle for manual gripping by a user;

the distal end comprising means for engaging a hook, the means for engaging a hook consisting of:

a plane surface at the distal end of the rod member which extends both across the longitudinal axis from the lower portion toward the upper portion and in a plane which is 25 degrees relative to the longitudinal axis;

a hole adjacent to the distal end, the hole extending downwardly through the rod member from the upper portion toward the plane surface and intersecting the plane surface, the axis of the hole being 50 degrees relative to the plane of the plane surface;

a V-shaped zero-width slit that expands to admit a line or leader into the hole and then closes to prevent the line or leader from exiting the hole, the slit extending rearwardly along the longitudinal axis from an upper edge of the plane surface toward the hole and intersecting the hole, the slit being defined by two distal end portions of the rod member on each lateral side of the slit which taper inwardly from the upper edge of the plane surface toward the hole such that the slit is more narrow towards its intersection with the hole than at the plane surface.

2. The device in accordance with claim 1 wherein the device is made by machining appropriate thermoplastic or thermoset materials.

3. The device in accordance with claim 1 wherein the device is made by injection molding.

4. The device in accordance with claim 3 wherein a molding powder used in the injection molding consists of 70–80% polycaprolactam, 20–30% chopped glass fiber and 1–3% carbon black.

5. The device in accordance with claim 1 wherein the handle is composed of fins.

6. The device in accordance with claim 1 wherein the distal end is connected to the handle by a thin-walled channel.

7. The device in accordance with claim 1 wherein the handle is long enough to prevent a user's hand from getting wet.

8. The device in accordance with claim 1 wherein the handle is long enough to prevent injury to the user from toothy fish.

9. The device in accordance with claim 1 in which the handle is a non-slip handle.

10. A device for removing a hook from a fish's lip, jaw, mouth or throat without removing the fish from the water or handling it in any way, said device comprising:

a rod member with proximal and distal ends, a longitudinal axis extending therebetween, and upper and lower portions;

the proximal end having a handle for manual gripping by a user;

the distal end comprising means for engaging a hook, the means for engaging a hook consisting of:

a plane surface at the distal end of the rod member which extends both across the longitudinal axis from the lower portion toward the upper portion and in a plane which is 25 degrees relative to the longitudinal axis;

a hole adjacent to the distal end, the hole extending downwardly through the rod member from the upper portion toward the plane surface and intersecting the plane surface, the axis of the hole being 50 degrees relative to the plane of the plane surface;

a V-shaped slit wide enough to admit the line or leader thereinto, the slit extending rearwardly along the longitudinal axis from an upper edge of the plane surface toward the hole and intersecting the hole, the slit being defined by two distal end portions of the rod member on each lateral side of the slit which taper inwardly from the upper edge of the plane surface toward the hole such that the slit is more narrow at its intersection with the hole than at the plane surface.

11. A device in accordance with claim 10 wherein the device is machined from metal.

12. A device in accordance with claim 10 wherein the device is cast from metal.

13. A device in accordance with claim 10 consisting of a metallic distal end and a non-metallic handle.

* * * * *